United States Patent [19]

Bryne

[11] Patent Number: 5,324,059
[45] Date of Patent: Jun. 28, 1994

[54] AERODYNAMIC BICYCLE

[76] Inventor: Richard M. Bryne, 2172 Pine St., San Diego, Calif. 92103

[21] Appl. No.: 124,425

[22] Filed: Sep. 21, 1993

Related U.S. Application Data

[63] Continuation of Ser. No. 857,270, Mar. 25, 1992, abandoned.

[51] Int. Cl.$^5$ ............................................... B62K 3/02
[52] U.S. Cl. .................................. 280/283; 280/281.1; 280/288.4
[58] Field of Search .................. 280/281.1, 283, 288.4; 267/131, 132

[56] References Cited

U.S. PATENT DOCUMENTS

| 636,726 | 11/1899 | Hindmarsh | 280/283 |
| 4,732,404 | 3/1988 | Coetzee | 280/283 |
| 4,750,754 | 6/1988 | Lennon | 280/288.4 X |
| 5,148,327 | 9/1992 | Gaxiola, Jr. | 280/288.4 X |

FOREIGN PATENT DOCUMENTS

| 495787 | 9/1950 | Belgium | 280/283 |
| 3308772 | 9/1984 | Fed. Rep. of Germany | 280/283 |

*Primary Examiner*—Margaret A. Focarino
*Assistant Examiner*—Carla Mattix
*Attorney, Agent, or Firm*—Brown, Martin, Haller & McClain

[57] ABSTRACT

The aerodynamic bicycle comprises a bar or beam which connects at the rear to the rear wheel hub and at the front to a exoskeletal handlebar and downward extension which attaches to the front wheel. Just forward of the rear wheel, a vertical tube is attached to the bar so that it has limited pivoting capability. At the top of the vertical tube, a second tube inserts slidably within the vertical tube and is supported therein by a shock-absorbing device or material. The bottom of the second tube provides the attachment means for the pedal crank and chain rings. Hand-holds and arm rests are integrated into the exoskeletal handlebar so the exoskeletal handlebar itself is used for steering. To permit a complete tuck for racing, a pair of mirrors is provided so the rider can keep his or her head down and rest his or her helmet on the exoskeletal handlebar but still see forward.

34 Claims, 2 Drawing Sheets

AERODYNAMIC BICYCLE

This is a continuation of application Ser. No. 07/857,270, filed Mar. 25, 1992 now abandoned.

BACKGROUND OF THE INVENTION

In recent years, a substantial amount of effort in the bicycle industry has been devoted to increasing the speed of a bicyclist by decreasing both weight and wind resistance. Bicycle frames have gone from heavy steel to lightweight aluminum, titanium or high-tech steel and composites to dramatically decrease frame weight. Modifications in other components, including lighter wheels, clipless pedals, cranks and handlebars have additionally lightened the bicycle's total weight. The techniques to cut wind resistance include hidden cables, disk or tri-spoke wheels and redesigned handlebars. The "aero" handlebars cause the rider to narrow his or her own profile by moving the arms forward with the elbows in close to the central plane of the bicycle. Aero handlebars allow a drag reduction of over twenty percent compared with standard drop style bars, and tri-spoke wheels cut wind resistance by over fifty percent compared with conventional spoke wheels. Clearly, the move toward aerodynamic configuration has achieved much. The continuing goal of many companies within the industry is to make the most aerodynamic shape possible to optimize the rider's efficiency of effort.

While most of the recent improvements have occurred in components, many bicycle manufacturers are offering rear suspension mountain bikes in which the rear fork is attached to the front triangle by a pivoting joint and a shock absorber. This, however, provides only shock absorption and does not enhance aerodynamics. Other than the rear suspension modifications, the basic bicycle frame has remained the same with the exception of necessary modifications to accommodate the newer, lighter-weight frame materials. In order to achieve the maximum effect of aerodynamics and biomechanical efficiency it is desirable to redesign the entire bicycle.

SUMMARY OF THE INVENTION

It is an object of the present invention to provide an exoskeletal aerodynamic bicycle in which the frame and components minimize the rider's wind resistance and are light in weight.

It is a further object of the present invention to provide a bicycle whose frame geometry can be adjusted while in use to optimize biomechanical and aerodynamic efficiency.

Another object of the present invention is to provide a bicycle which permits the rider to maintain an optimal aerodynamic and biomechanical racing position regardless of the terrain encountered, still retaining full forward vision.

Still another object of the present invention is to provide a bicycle which minimizes the energy-robbing effects of rough terrain on its rider.

In an exemplary embodiment, the aerodynamic bicycle comprises a bar or beam which connects at the rear to the rear wheel hub and at the front to an exoskeletal handlebar structure that replaces the handlebar and forks on a traditional style bicycle. Just forward of the rear wheel, a vertical tube is attached to the bar so that it has limited adjustable pivoting capability. Closely fitted within the vertical tube, a second tube extends from both the top and bottom of the vertical tube and is supported therein by a shock-absorbing device or material. The bottom of the second tube provides the attachment means for the pedal crank and chain rings so that the seat and crank assembly telescope up and down together. The post on which the seat is mounted is inserted into the second tube and locked in place.

The structural exoskeletal handlebar covers the front portion of the frame, extending down to the end of the front extension in an inverted teardrop shape. Handholds and arm rests are integrated into the exoskeletal handlebar so the rider's arms fit within contoured shelves in the exoskeletal handlebar, and so the exoskeletal handlebar structure itself is used for steering. To permit a complete head-down aerodynamic tuck for racing, a pair of mirrors is provided within the exoskeletal handlebar so the rider can keep his or her head down in an aerodynamic profile but still see forward. The use of two mirrors provides the actual view rather than a reverse image.

Several of the individual features can be added as after market items to a conventional bicycle, or marketed singularly. For example, the front exoskeletal handlebar and optical system can be retrofit to existing bicycles. The front exoskeletal handlebars can also be configured to replace the existing handlebars and front fork on a conventional bicycle. It could be made as a replacement for the handlebars and stem, as a replacement for the handlebars, stem and front fork and as a replacement for handlebar and stem with an integral shock-absorbing telescopic fork within its aerodynamic profile. The shock-absorbing pivoting frame would also perform well, without the aero accessory features, as an all terrain bicycle frameset.

BRIEF DESCRIPTION OF DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1A:
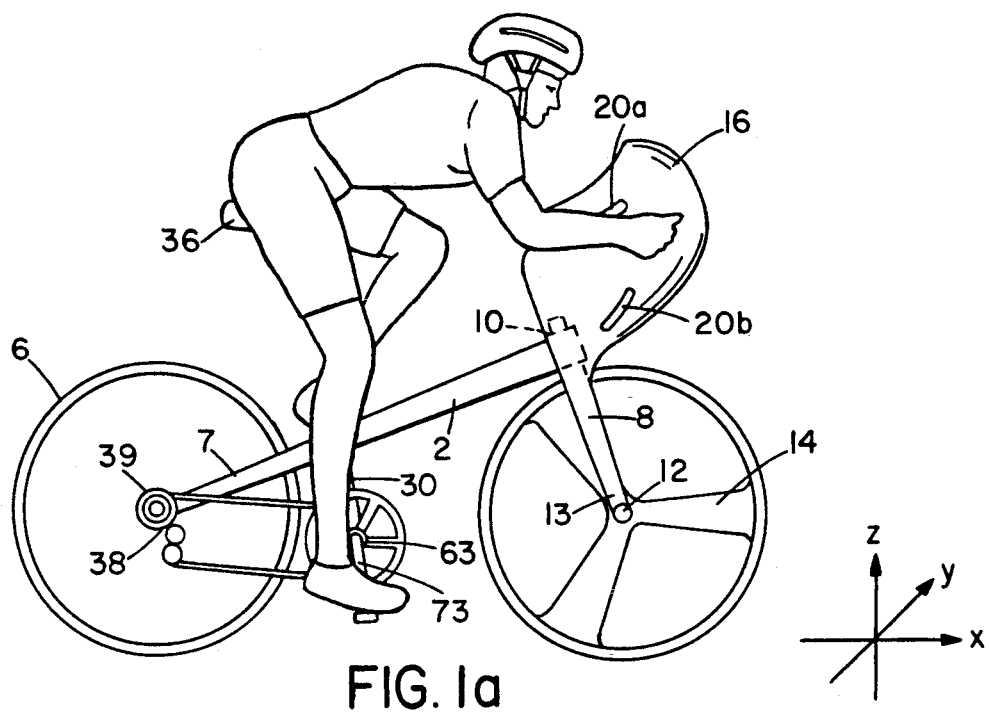
FIGS. 1a and 1b are side elevations of the aerodynamic bicycle with references axes provided.
Figure 1B:
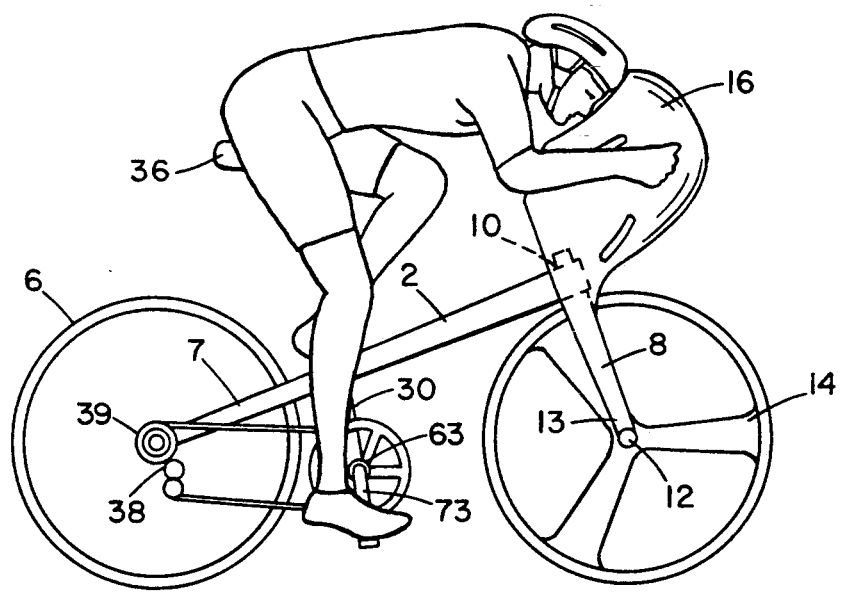

As shown in FIGS. 1a and 1b, the bicycle of the preferred embodiment comprises a frame with sloped bar 2 which attaches to the hub 4 of rear wheel 6 at its rearward end 7 and to extension 8 at its forward end 10. Extension 8 pivots within a tubular opening in the forward end of bar 2 and retains hub 12 of front wheel 14 at its lower end 13 and exoskeletal handlebar 16 at its upper end. Hand-holds 20 and forearm rests 22 are incorporated into the exoskeletal handlebar, as well as brake actuators and gear controls. A periscope made up of mirrors 50, 51, and 52 is included within the exoskeletal handlebar to permit the rider to keep his or her head down and still see ahead. Vertical tube 30 is pivotally attached to bar 2 in front of the rear wheel 6 to provide limited forward and backward tilt. A shock-absorbing assembly, shown in detail in FIG. 5 may be included in the vertical tube 30 which allows seat 36 to have limited up-and-down motion damping to minimize the effects of rough terrain on the rider.

Figure 2:
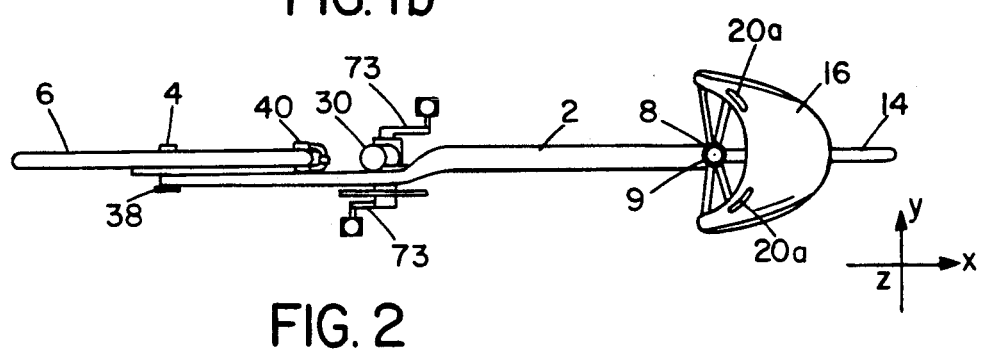
FIG. 2 is a top view of the aerodynamic bicycle.

Looking at the top of the frame 1 in FIG. 2 the rearward end 7 of bar 2 bows outward from the x-z center plane of the bicycle so that rear wheel 6 lies in the same x-z plane. (Coordinate axes are provided for reference.) The gear mechanism 38 and rear brake 40 are mounted on bar 2 located near hub 4. A single-sided mounting allows easy access for removal/attachment of the wheel. A standard two-sided mounting configuration may also be incorporated, using a rear fork. As illustrated, rear wheel 6 is a disk wheel for minimal drag, but a tri-spoke or standard spoke wheel can also be used with some sacrifice of aerodynamics.

Figure 6:
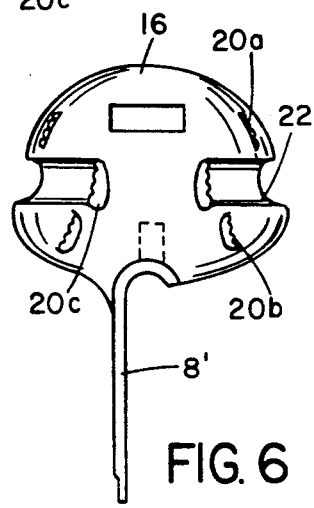
FIG. 6 is a front view of the exoskeletal handle bar of an alternate embodiment.

Extension 8 rotates freely within tubular opening 9 in bar 2 with smooth rotation facilitated by bearings as are known in the art. Extension 8 may be a fork with supports straddling the front wheel 14, or can be a single bar 8 offset to one side, as shown in FIG. 6 similar to the rear wheel attachment, on either the same side of the center plane as rearward end 7 or on the opposite side. Extension 8 attaches to hub 12 of front wheel 14 so that front wheel 14 rotates freely around the hub axle.

Figure 3A:
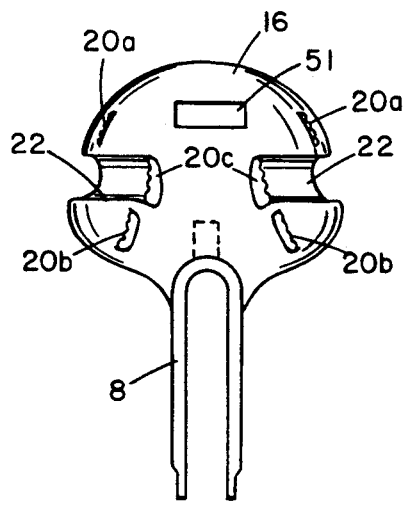
FIGS. 3a, 3b and 3c are front, side and top views, respectively, of the exoskeletal handlebar of the preferred embodiment.
Figure 3B:
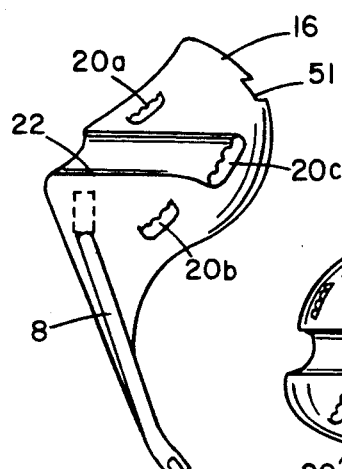
Figure 3C:
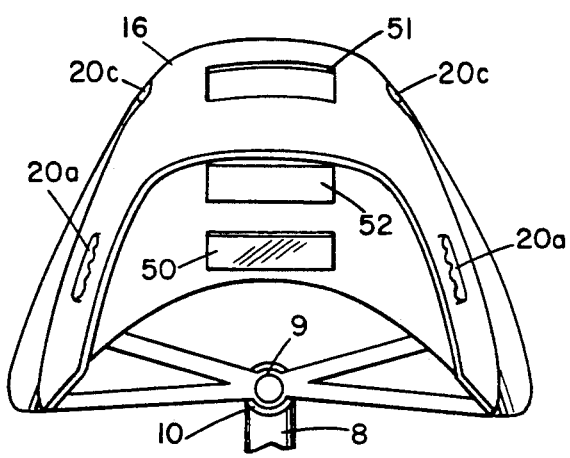

Exoskeletal handlebar 16 is attached at the top of extension 8, and may be formed integrally, therewith. As shown in FIGS. 3a, 3b and 3c, several scalloped hand-holds 20 are molded into the shell to allow the rider to vary his or her riding position as needed. For climbing, the rider would hold hand-holds 20a and, for sprinting, hand-holds 20b. In the optimum level ground racing position, the rider will be leaning forward and downward with his or her hands extended toward the front portion of the exoskeletal handlebar 16, holding on to hand-holds 20c. Arm rests 22 are provided in the form of a smooth shelf for the rider to rest his or her elbows and forearms while holding onto the forward hand-holds. As is known in the art, "aero" handlebars with forearm rests increase a rider's efficiency by allowing a lower riding position with decreased lower back strain while extending the rider's upper body to avoid restricting breathing. The height of exoskeletal handlebar 16 is high enough for the rider to rest his or her helmet on its top and to provide a relatively smooth front surface as seen by the air in front of the bicycle with the rider in the racing position, as in FIG. 1b. It may be desirable to place foam padding at the upper edge of the exoskeletal handlebar 16 for comfort. The rider's helmet will form a continuation of the exoskeletal handlebar's aerodynamic flow lines, causing the streamlines to follow a substantially continuous smooth surface. The exoskeletal handlebar 16 will need to be low enough, however, to allow the rider to see over it comfortably while riding in an upright position.

Also mounted within the exoskeletal handlebar 16 is a set of mirrors 50 and 52 which are adjustable for the comfort of the rider. Mirror 50 is located within direct view of the rider. Mirror 52 is forward of and above mirror 50 and is adjustably tilted so that it has a direct view through a window 51 of the panorama in front of the bike and it reflects that image to mirror 50. Mirror 52 should be aimed to look far enough in front of the bike to give the rider sufficient time to see and react to hazards ahead.

Figure 4:
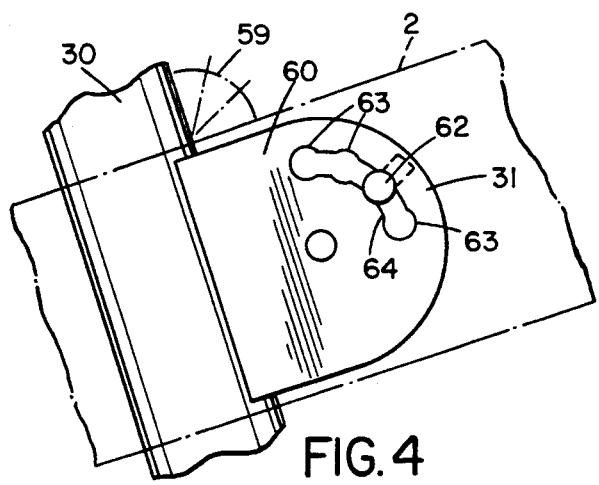
FIG. 4 is a diagrammatic side view, partially cut away, of the vertical tube/bar intersection.

Vertical tube 30 is attached to bar 2 as shown in FIG. 4. In order to avoid compromising the strength of the frame or the operation of the pedal crank, the pivot point is separated from the spindle 63 and is located above and in front of the spindle 63. Tab 60 is securely attached to vertical tube 30 and extends forward from it. An exemplary means of adjustably connecting the bar 2 and vertical tube 30 includes a set consisting of an interacting channel and pin which allows the angle 59 between vertical tube 30 and bar 2 to be varied for different riding conditions, i.e., different terrain. As illustrated, one flanged pin 62 extends from tab 60 to mate with channel 64 in bar 2, however more tabs and channels may be used. The combination of the pin and channel provides a limit to the pivoting of vertical tube 30. A rack-and-pinion combination can also be adapted for this purpose.

The range of variability of angle 59 is determined by the optimum riding positions for hill climbing, flat surfaces and riding downhill as well as the rider's comfort preferences. Pivoting the seat forward puts the rider in a better position for hill climbing by shifting the rider's center of gravity to keep the rider's legs at the most effective angle for pedaling power. Thus, rather than sliding forward on the seat to an uncomfortable position, or always having to stand up, the rider can still be comfortably seated while at the best angle for climbing. The seat could then be moved backward for riding on flat terrain, again shifting the center of gravity to the optimum location. The vertical tube 30 is not free to pivot at all times but, instead, locks in any position within its limited arc range until released by activation of a control, such as a cable/lever combination which releases a spring 31 on pin 62 to lift it out of one depression 63, allowing it to be reseated in another depression 63. A number of incremental spacings may be available to shift repeatably to a desired position. The details of the shock-absorbing seat tube also explain how the distance between the seat and pedal crank are maintained constant.

Figure 5:
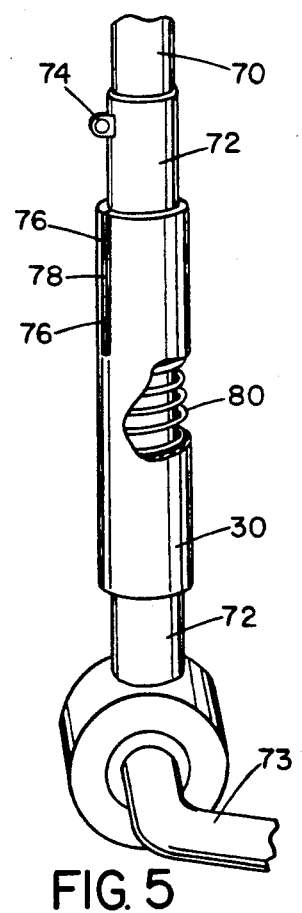
FIG. 5 is a diagrammatic side view, partially cut away, of the vertical tube/seat post assembly.

FIG. 5 illustrates the details of the shock-absorbing seat tube. As in conventional bicycles, seat 36 is mounted on seat post 70, such mounting which may include tilt and forward/backward adjustment. Seat post 70 inserts and is locked into suspension tube 72. This locking is achieved in a manner similar to that used for height adjustment of seats. Here, a bolt 74 tightens the upper diameter of suspension tube 72 around seat post 70. Suspension tube 72 is inserted into vertical tube 30 so that it moves freely up and down within a selected range of travel. Suspension tube 72 is prevented from rotation within vertical tube 30 by pins 76 which fit into a slot 78 inside vertical tube 30, or by using a non-round cross-sectional shape for the two tubes, for example, an airfoil or oval shape. Inside vertical tube 30, a spring 80 or resilient material is fixed so that it contacts and supports the center portion of suspension tube 72. When the downward force on the seat increases by hitting rough terrain, the suspension tube 72 compresses damping device or material 80, shown here as a spring, to absorb the shock, or a portion thereof. Other resilient materials may include foam rubber, Neoprene ® or similar spongy material, and can also consist of hydraulic or pneumatic devices. Suspension tube 72 continues through the length of vertical tube 30 and extends out at its bottom to provide a housing for the pedal crank 73 and associated bearings. The distance between the seat 36 and pedal crank 73 remains constant, even during compression of the shock absorber, avoiding compromising the rider's optimum leg-to-pedal position. Thus, the frame receives the shock, but the rider is insulated from the shock by the separate movement of suspension tube 72.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. An aerodynamic bicycle comprising:
   a bar having a forward end and a rearward end, said rearward end having means for attaching a rear wheel hub;
   an extension pivotally extending downward from said forward end of said bar and having means for attaching a front wheel hub;
   a first frame tube having a first top end and a first bottom end pivotally attached to said bar;
   a second frame tube having a second top end and a second bottom end slidably and concentrically disposed within said first frame tube with means at said second top end for concentric attachment of a seat post and means at said second bottom for rotatable attachment of a pedal crank;
   a shock-absorbing means disposed within said first frame tube for minimizing transfer of shocks from said first frame tube to said second frame tube;
   a locking mechanism for limiting pivotal movement of said first frame tube with respect to said bar;
   an exoskeletal handlebar disposed at said forward end of said bar and fixed to said extension, said exoskeletal handlebar having means for seeing therethrough;
   a plurality of hand-holds within said exoskeletal handlebar on which a rider may rest his/her hands and arms; and
   an optical assembly positioned to permit forward viewing while the rider's head is down in racing position.

2. An aerodynamic bicycle as in claim 1 wherein said rearward end of said bar is bowed outward to at least one side so that a rear wheel attached to said rear wheel hub lies in a common plane with said forward end of said bar.

3. An aerodynamic bicycle as in claim 1 wherein said exoskeletal handlebar extends to cover said extension at a point of attachment of said extension to said front wheel hub.

4. An aerodynamic bicycle as in claim 1 wherein said extension and said exoskeletal handlebar are integrally formed.

5. An aerodynamic bicycle as in claim 1 wherein said locking mechanism includes at least one pin on said bar which mates with at least one arcuate channel on said first frame tube whereby an angle between said bar and said first frame tube can be adjusted forward or rearward from vertical.

6. An aerodynamic bicycle as in claim 1 wherein said exoskeletal handlebar has a window.

7. An aerodynamic bicycle as in claim 1 wherein said optical assembly comprises two mirrors.

8. An aerodynamic bicycle as in claim 1 wherein said plurality of hand-holds is formed integrally with said exoskeletal handlebar.

9. An aerodynamic bicycle as in claim 1 wherein said extension comprises a single tube bowed outward so that a front wheel attached to said front wheel hub lies in a common plane with said forward end of said bar.

10. An aerodynamic bicycle as in claim 1 wherein said extension comprises a fork extending on both sides of said front wheel hub.

11. An aerodynamic bicycle as in claim 1 wherein said bar comprises a hollow tube.

12. An aerodynamic bicycle as in claim 1 wherein said extension includes a shock-absorbing suspension.

13. An aerodynamic bicycle comprising:
   a frame having a front end and a rear end with means for attachment of a rear wheel;
   a steering means rotatably disposed at said front end, said steering means comprising:
     a front extension having an upper end and a lower end for rotatable attachment of a front wheel at said lower end;
     an exoskeletal handlebar structure fixedly disposed at said upper end of said front extension and having an aerodynamic profile;
     a plurality of hand-holds integrally formed in said exoskeletal handlebar structure by which a rider may control said steering means, at least a portion of said plurality of hand-holds being located within an exterior surface of said exoskeletal handlebar structure;
     means for seeing through said exoskeletal handlebar structure so that said rider can see forward when the rider's view is at least partially obstructed by said exoskeletal handlebar structure; and
   an optical assembly for providing a forward view while the rider's head is down.

14. An aerodynamic bicycle as in claim 13 wherein a plurality of armrests is formed integrally with said exoskeletal handlebar structure.

15. An aerodynamic bicycle as in claim 13 wherein said front extension is formed integrally with said exoskeletal handlebar structure.

16. An aerodynamic bicycle as in claim 13 wherein said frame comprises a stiff bar extending from said rear wheel to said exoskeletal handlebar and a vertical tube disposed at a center of said bar.

17. An aerodynamic bicycle as in claim 16 wherein said vertical tube is attached pivotally to said bar whereby an angle between said bar and said vertical tube is adjustable.

18. An aerodynamic bicycle as in claim 17 wherein said vertical tube has a locking means cooperating with said bar whereby pivoting of said vertical tube is limited.

19. An aerodynamic bicycle as in claim 18 wherein said locking means has incremental settings.

20. An aerodynamic bicycle as in claim 13 wherein said frame includes a shock-absorbing seat tube.

21. An aerodynamic bicycle as in claim 20 wherein said shock-absorbing seat tube comprises:
   a suspension tube slidably disposed within said vertical tube; and
   a resilient device connecting said suspension tube to said vertical tube.

22. An aerodynamic bicycle as in claim 21 wherein said suspension tube retains a pedal crank assembly at its lower end.

23. A bicycle comprising:
- a frame comprising a bar having a front end and a rear end attached to a substantially vertical tube, said bar having means for attachment of a rear wheel;
- a front extension rotatably mounted in said front end for rotatable attachment of a front wheel;
- a plurality of hand-holds for controlling rotation of said front extension;
- a seat post for attaching a seat to said frame at said vertical tube; and
- shock-absorbing means within said vertical tube to diminish shocks and vibrations transferred to said seat;
- wherein said seat and a pedal crank are at a fixed distance from each other when said shock-absorbing means is activated.

24. A bicycle as in claim 23 wherein said vertical tube is pivotally attached to said bar whereby an angle of said vertical tube is variable.

25. A bicycle as in claim 24 wherein said vertical tube includes a locking means whereby pivoting of said vertical tube is limited.

26. A bicycle as in claim 23 wherein said front extension includes an exoskeletal handlebar disposed to retain said hand-holds.

27. A bicycle as in claim 26 wherein said exoskeletal handlebar includes an optical means for forward viewing while a rider is facing substantially downward.

28. A bicycle as in claim 23 wherein said shock-absorbing means comprises a suspension tube having an upper end and a lower end slidably disposed within said vertical tube and a resilient device providing connection between said vertical tube and said suspension tube.

29. A bicycle as in claim 28 wherein said suspension tube retains said pedal crank at its lower end.

30. A bicycle as in claim 28 wherein said seat post is retained within said suspension tube.

31. A bicycle comprising:
- a frame having a front end, a rear end and a vertical tube for retaining a bicycle seat at its upper end, said frame having means for attachment of a rear wheel and means for retaining a peddle crank at a lower end of said vertical tube, said peddle crank being disposed at a fixed distance from said bicycle seat;
- a front fork rotatably mounted in said front end for attachment to a front wheel;
- a plurality of handholds attached to said front fork by which a rider may steer rotation of said front fork;
- a pivoting attachment means for pivotally connecting said vertical tube with respect to a remainder of said frame; and
- a locking means for controlling the pivoting said pivoting attachment means, said locking means being releasable and refastenable by said rider while riding said bicycle;
- wherein pivoting of said pivoting attachment means is permitted by release of said locking means so that said rider can alter his/her seated position with respect to said remainder of said frame while said rider is riding said bicycle, wherein said fixed distance between said bicycle seat and said pedal crank remains constant.

32. A bicycle as in claim 31 wherein said shock-absorbing seat post is disposed within said vertical tube.

33. A bicycle as in claim 31 wherein said remainder of said frame is a bar.

34. A bicycle as in claim 31 wherein said front fork includes an exoskeletal handlebar and said hand-holds are formed integrally therewith.

* * * * *

UNITED STATES PATENT AND TRADEMARK OFFICE
CERTIFICATE OF CORRECTION

PATENT NO. : 5,324,059
DATED : June 28, 1994
INVENTOR(S) : Richard M. Bryne

It is certified that error appears in the above-indentified patent and that said Letters Patent is hereby corrected as shown below:

- COLUMN 8, LINE 20, AFTER "PIVOTING" INSERT --OF--.

Signed and Sealed this

Sixth Day of December, 1994

Attest:

BRUCE LEHMAN

*Attesting Officer*  *Commissioner of Patents and Trademarks*